United States Patent Office 3,413,413
Patented Nov. 26, 1968

3,413,413
SWITCHING ARRANGEMENT FOR THE TRANSMISSION OF DIRECT CURRENT TELEGRAPH SIGNAL UNITS

Anton J. Peisl, Munich-Pasing, Germany, assignor to Siemens Aktiengesellschaft, a corporation of Germany Filed Sept. 22, 1964, Ser. No. 398,454
Claims priority, application Germany, Sept. 23, 1963, S 87,452
8 Claims. (Cl. 178—69)

ABSTRACT OF THE DISCLOSURE

A circuit arrangement for the line transmission of direct current telegraph signal elements in which a transmitting device and a receiving device is connected by a symmetrical conductive line extending therebetween in which a low resistance mismatching is effected at each end of the line between such end and the adjacent associated device.

The invention relates to a circuit arrangement for the transmission of direct current telegraphic signal elements over lines symmetrically and conductively connected with sending and receiving devices.

It is a known practice in telegraphic technology to transmit the individual telegraphic signal elements over the line path in the form of direct current pulses. As a result of the capacitive and inductive couplings present between the individual conductors of a cable there occurs a cross-talk interference, especially in the conductors immediately adjacent to the particular telegraphic line involved. This cross-talk interference increases within the speech frequency band approximately proportionally with the telegraphing speed, so that the telegraphing speed cannot be selected as great as desired if it is desired not to exceed a certain value of the cross-talk interference, for example, 0.35 mv. psophometrically evaluated noise voltage, as prescribed by the DBP.

In order to restrict the cross-talk interference, it is a known practice to select a telegraphic transmitting voltage which is so low that the cross-talk intereference remains below the established limit. The telegraphic transmitting voltage, however, in turn, cannot be chosen arbitrarily low, since simultaneously with its reduction the distortion of the individual telegraphic signal elements increases. The time constant of the line path resulting from the line capacitance and the ohmic resistance value of the line inclusive of the terminal resistances at each end leads to a deformation of the originally rectangular telegraphic signal elements. In addition, the fact exists that each receiving direction has a certain response threshold, and therefore a lowering of the step amplitude in deformed telegraph signal elements leads to a contrary time displacement of the response and drop out time point in each signal element, whereby the actual signal element length of the respective telegraph signal elements delivered by the receiving device is altered with respective to the desired signal element length. This is generally termed telegraphic distortion. Because of the cross-talk interference and for reasons of the distortions mentioned, direct current telegraphy at speeds of more than 200 baud heretofore has been fundamentally impossible.

In order to attain a higher telegraphing speed irrespective of these conditions, attempts have hitherto been made to solve this problem by an arrangement wherein instead of direct current pulses, tone frequency pulses were utilized, because amplifier circuits for tone frequency pulses are technically considerably simpler to build than those for direct current pulses. A disadvantage of this technique is that a considerably greater expenditure with respect to circuit technology is required, since the direct current pulses produced at the transmitting end in any such device have to be converted into tone frequency pulses and at the receiving end reconverted into direct current pulses.

The invention has as its problem the creation of a circuit arrangement for the transmission of direct current telegraphic signal elements over symmetrical and conductively connected lines with transmitting and receiving devices inserted therein, which permits extremely wide latitude in the choice of the telegraphic transmission speed. For the solution to this problem, the invention proceeds with the concept of utilizing a low telegraphic transmitting voltage for the reduction of cross-talk interference, but to exclude to a high degree the telegraphic distortion simultaneously associated therewith, which heretofore made the transmission fundamentally impossible at higher signal element speeds and along longer lines, by a low resistance mismatching of the transmitting and receiving devices. According to the invention this problem is solved by an arrangement in which each transmitting device and each receiving device is connected to the appropriate line by a low resistance mismtach.

In this manner, according to the invention, through the low resistance mismatching at both ends of the line it is possible to keep the time constant of the line path so small that the charging and discharging of the line capacity associated with the direct current pulse transmission takes place so rapidly that even the briefest telegraphic signal element will still build up to full amplitude at the receiving end.

It is possible, within the scope of the invention, to effect a further reduction of the distortions within a certain telegraphic speed range, for example, up to 1800 baud, by arranging in each transmitting circuit a low pass filter, which is so dimensioned that it sufficiently suppresses at least the second harmonic of the fundamental telegraphic frequency. The second harmonic, within the above mentioned speed range, causes particularly in the conductors immediately adjacent to such transmission line, an interference voltage approximately as great as that of the fundamental telegraph frequency. This interfering frequency is largely suppressed by the low pass filter and the telegraphic voltage can be set at a higher value, whereby the distortions, viewed overall, will be lower than in an arrangement without a low pass filter.

In addition to the above mentioned favorable telegraphic speed range, there can also be achieved within the scope of the invention a distortion reduction by an arrangement in which, within the receiving device, there is inserted a line distortion corrector which consists of an RC-member in each conductor, operative to attenuate the amplitude of the longer current steps with respect to the amplitude of the shorter current steps.

Details of the invention will appear from the example of construction described with the aid of the drawings.

Through the mismatching member FAG1 the internal resistance of the entire transmitting device with respect to the line is made so low, for example 40Ω, that it lies considerably below the impedance of the line T11, whose value amounts, for example, to 600Ω. Simultaneously, through the mismatching member FAG1 the transmitting voltage is so established that over the coupling capacitance $C_k$ at the terminals resistance R1 of T12, on transmission of a test text there occurs maximally 0.35 mv. psophometrically measured noise voltage. At this noise voltage value and a telegraphic speed of 2400 baud, the transmitting voltage amounts to about 400 $mv._{eff}$ at 600Ω and the telegraphic current to about 0.2 $ma._{eff}$ with a line length of about 20 km. Despite this low level, the transmission, with ground symmetrical line termination, is substantially unaffected by external interference.

Within the scope of the invention the resistance mismatching of the line to the transmitting device can also be achieved through a correspondingly low internal resistance of solely the sending device. However, such a low internal resistance of the electronic sending relay ETS1 at the low telegraphic transmitting voltage necessary for response of cross-talk, is attainable simultaneously with sufficient freedom in transmission distortion, only with greater expenditure.

The relatively low receiving level at the output of line T11, for example, 30 mv., is amplified about 20 times by the direct current amplifier GV, so that the electronic receiving relay ETS2 connected to the amplifier output is controlled with certainty. The incoming telegraphic signal elements are thereby transmitted to the receiving subscriber T*n*2.

The low resistance members FAG1 and FAG2 arranged, according to the invention, at both ends of the line considerably reduce the time constant of the entire line path. In contrast to this, in the conventional direct current telegraphy, the transmitting device is matched to the line only through the longitudinal resistance which raises the line time constant. Through the low resistance mismatching, proposed according to the invention, and the use of a direct current amplifier it is possible to transmit direct current telegraphic signal elements at step speeds of several 1000 baud sufficiently free of distortion, and without inadmissibly high cross-talk interference, over long lines.

Figure 2:
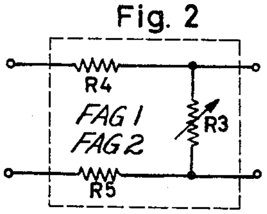
FIG. 2 illustrates the circuit diagram of a low ohmic mismatching member.

FIG. 2 illustrates an example of low resistance mismatching member utilized in the practice of the invention, which is composed of the ohmic resistors R3, R4 and R5. The desired operating voltage can be set by the adjustable resistor R3. Simultaneously, the resistor R3 determinatively influences the time constant of the line path. In this example, the resistor R3 is set at about 40Ω. Within the scope of the invention it would also be possible to select as a mismatching member a transformer or a reactance combination, but additional provisions would then have to be made for the transmission of the permanent direct current states.

Figure 3:
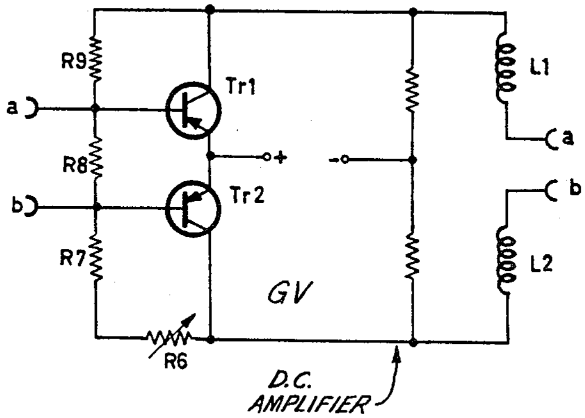
FIG. 3 illustrates a schematic wiring diagram of a direct current amplifier utilized in accordance with the invention.

In FIG. 3 there is illustrated a symmetrical direct current amplifier GV utilized according to the invention, which in this example is a push-pull amplifier. It consists primarily of the two transistors T*r*1 and T*r*2 operated in class A amplifier operation, in which the two transistors are selected for symmetry with respect to their characteristic curves. Both transistors receive the base bias voltage over corresponding resistors R6 and R7 or R9, inserted between the respective bases and collectors, the neutral setting of the push-pull amplifier being effected by adjustment of the variable resistor R6. The bases of the two resistors are directly connected with the line end.

Figure 1:
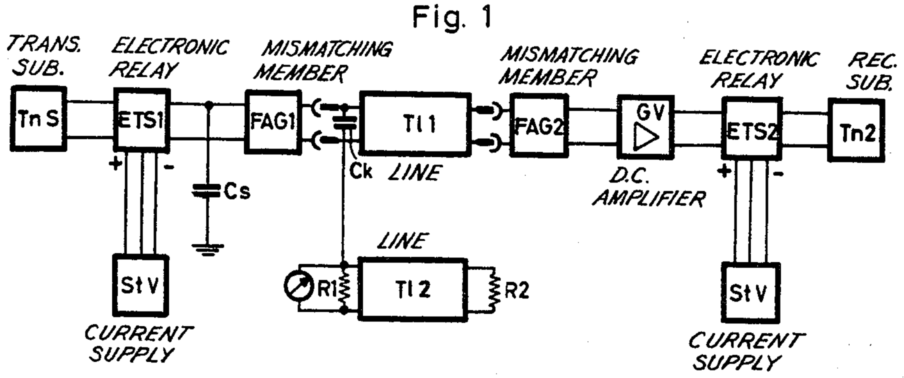
FIG. 1 illustrates a schematic wiring diagram of a transmission path arranged according to the invention.

Between the two transistor bases is disposed a resistor R8 which determines the input resistance of the direct current push-pull amplifier, which resistance, for example, amounts to 300Ω. This resistance thus also is considerably lower than the line impedance of, for example, 600Ω. In FIG. 3, therefore, the mismatching member to be provided on the receiving end, which is designated as FAG2 in FIG. 1, is included in the amplifier circuit. On the output side there are inserted in such direct current push-pull amplifier inductances L1 and L2, which, together with the input capacitance of the electronic receiving relay ETS2, connected at such output side in FIG. 1, form a low pass filter for the removal of high frequency interference voltages.

Figure 4:
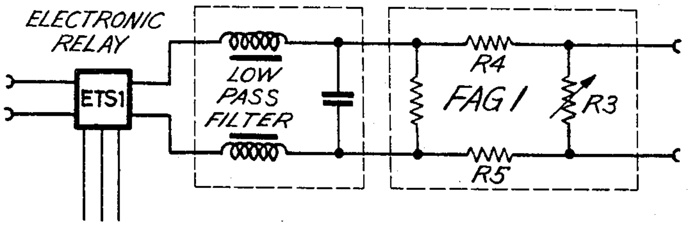
FIG. 4 illustrates a schematic wiring diagram of a low pass filter utilized in accordance with the invention.

In FIG. 4 there is illustrated a low pass filter utilized according to the invention, which can be inserted in the transmission path shown in FIG. 1 between the electronic sending relay ETS1 and the mismatching member FAG1, illustrated in FIG. 4 as constructed in accordance with FIG. 2 but including an additional shunt resistor. This low pass filter represented in FIG. 4, according to the invention, is so dimensioned that it sufficiently suppresses the second harmonic of the fundamental telegraphic frequency.

Figure 5:
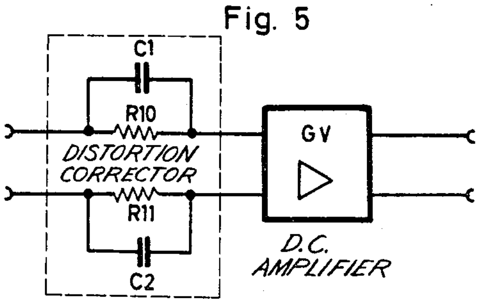
FIG. 5 illustrates a schematic wiring diagram of a line distortion corrector utilized according to the invention.

In FIG. 5 is presented the schematic wiring diagram of a line distortion corrector composed of simple RC members R10, C1 and R11, C2 which, in the embodiment illustrated are disposed ahead of the amplifier GV. In this example, for reasons of symmetry, in each conductor there is arranged an RC member which in each case attenuates the amplitude of the longer current steps with respect to the amplitude of the shorter curent steps. If, within the scope of the invention, it is desired to dispense with the symmetry, one RC member in one conductor could be enlarged.

The present invention is not restricted to the transmission of telegraphic messages, as described in the disclosed example, but can be utilized in the same scope for any kind of message transmission in pulse form. Moreover, obviously within the scope of the invention there may be present, between the two subscribers and the line, selector switching means or branch-off switching means for building up or branching off of a communication path.

Changes may be made within the scope and spirit of the appended claims which define what is believed to be new and desired to have protected by Letters Patent.

In FIG. 1 on the left hand side, there is represented a transmitting subscriber T*n*S and on the right hand side a receiving subscriber T*n*2. The transmitting subscriber T*n*S is connected to a transmitting device, comprising the electronic relay ETS1 and the current supply S*t*V. Through the capacitance $C_s$ the sending device is adjusted to full ground symmetry. In order to reduce the telegraphic voltage to the value allowable for reasons of cross-talk, and simultaneously to terminate the line with a low resistance according to the invention there is inserted between the transmitting device and the line T11 a mismatching member FAG1, which will be considered in greater detail in connection with FIG. 2.

A line T12 adjacent to this telegraphic line is also illustrated in this embodiment. The line T12 is actually terminated at both ends in the usual manner with a resistance $R1=R2=600\Omega$ for noise voltage measurements. The coupling capacitance $C_k$ present between the two lines T11 and T12 produces a cross-talk attenuation of 7.0 Np at 800 C. This value is to be regarded as the poorest cross-talk attenuation value which can be attained in non-defective local cables. At the other end of line T11 there is likewise inserted a low resistance mismatching member FAG2, which is disposed between the line T11 and the direct current amplifier GV. The construction of such direct current amplifier will be considered in greater detail in connection with the description of FIG. 3. This direct current amplifier, together with the electronic receiving relay connected to the outlet side thereof, constitutes the receiving device of subscriber T*n*2.

I claim:

1. In a circuit arrangement for the line transmission of direct current telegraph signal elements, the combination of a transmitting device, a receiving device, and a symmetrical and conductively connecting line extending therebetween, and connecting said devices, and respective means at the transmitting device and at the receiving device for producing a low resistance mismatching of the associated device to the adjacent line end.

2. A circuit arrangement according to claim 1, wherein there is arranged in a line path at least one low pass filter.

3. A circuit arrangement according to claim 2, wherein a low pass filter is inserted in the circuit of the transmitting device and in that of the receiving device.

4. A circuit arrangement according to claim 3, wherein the low pass filter arranged at the transmitting device is so dimensioned that it sufficiently suppresses at least the second harmonic of the fundamental telegraphic frequency.

5. A circuit arrangement according to claim 3, wherein the low pass filter at the receiving device is so dimensioned that it sufficiently suppresses high-frequency interferences received from the line.

6. A circuit arrangement according to claim 1, wherein the receiving device comprises a line distortion corrector, a direct current amplifier and the receiving relay proper.

7. A circuit arrangement according to claim 6, wherein the direct-current amplifier is constructed as a push-pull amplifier comprising transistors operated in class A operation, with the bases of the transistors being directly connected to the line.

8. A circuit arrangement according to claim 6, wherein the direct-current push-pull amplifier is constructed as a push-pull amplifier comprising transistors operated in class A operation with the bases of the transistors being connected with the line over a line distortion connector.

References Cited

UNITED STATES PATENTS

| | | | |
|---|---|---|---|
| 2,515,058 | 7/1950 | Roquet et al. | 178—69 |
| 3,090,009 | 5/1963 | Engelbrecht et al. | 333—32 |

FOREIGN PATENTS

| | | |
|---|---|---|
| 261,338 | 3/1927 | Great Britain. |

THOMAS A. ROBINSON, *Primary Examiner.*